(12) United States Patent
Mignon et al.

(10) Patent No.: US 11,019,802 B2
(45) Date of Patent: Jun. 1, 2021

(54) AGRICULTURAL MACHINE FOR TRANSPORTATION AND DISTRIBUTION OF BULK PRODUCTS

(71) Applicant: KUHN-AUDUREAU SA, Copechagniere (FR)

(72) Inventors: Florent Mignon, Saint-Andre-Goule-d'Oie (FR); Benoit Sorin, Vieillevigne (FR)

(73) Assignee: KUHN-AUDUREAU SA, Copechagniere (FR)

( * ) Notice: Subject to any disclaimer, the term of this patent is extended or adjusted under 35 U.S.C. 154(b) by 303 days.

(21) Appl. No.: 16/136,511

(22) Filed: Sep. 20, 2018

(65) Prior Publication Data

US 2019/0082651 A1    Mar. 21, 2019

(30) Foreign Application Priority Data

Sep. 20, 2017   (FR) ..................... 17 58685

(51) Int. Cl.
*A01K 5/00* (2006.01)
*B01F 7/00* (2006.01)
(Continued)

(52) U.S. Cl.
CPC .............. *A01K 5/004* (2013.01); *B01F 7/162* (2013.01); *B01F 7/165* (2013.01); *B01F 7/20* (2013.01); *B01F 15/0267* (2013.01)

(58) Field of Classification Search
CPC ......... A01K 5/004; B01F 7/162; B01F 7/165; B01F 7/20; B01F 15/0267
See application file for complete search history.

(56) References Cited

U.S. PATENT DOCUMENTS 5,647,665 A    7/1997  Schuler
2004/0013035 A1*  1/2004  Tamminga ............. A01K 5/004
                                                366/314
(Continued)

FOREIGN PATENT DOCUMENTS

GB          2 310 793       9/1997

OTHER PUBLICATIONS

French Preliminary Search Report dated May 23, 2018 in French Application 17 58685 filed on Sep. 20, 2017 (with English Translation of Categories of Cited Documents and Written Opinion).

*Primary Examiner* — Anshu Bhatia
(74) *Attorney, Agent, or Firm* — Oblon, McClelland, Maier & Neustadt, L.L.P.

(57) ABSTRACT

An agricultural machine for transportation and distribution of bulk products, including a tank, which is mounted on a rolling chassis, which is provided with at least one sealable opening situated at the level of the bottom of the tank and which is equipped with at least one mobile device performing scraping of the bottom and favoring ejection of the product. An agricultural machine wherein the mobile device or each mobile device is mounted to rotate around a vertical shaft or axis, perpendicular relative to the plane of the bottom and including at least two separate radial arms, distributed around the axis and sweeping over substantially the entire surface of the bottom, wherein the thickness or the height of each arm relative to the bottom is smaller than the height of the lateral opening or of each lateral opening.

9 Claims, 6 Drawing Sheets

(51) Int. Cl.
*B01F 7/16* (2006.01)
*B01F 15/02* (2006.01)
*B01F 7/20* (2006.01)

(56) References Cited

U.S. PATENT DOCUMENTS

| | | | |
|---|---|---|---|
| 2007/0274151 A1 | 11/2007 | Albright | |
| 2011/0121114 A1* | 5/2011 | Neier | B01F 13/1044 |
| | | | 241/101.8 |
| 2013/0206884 A1* | 8/2013 | Pastoor | B02C 19/00 |
| | | | 241/101.71 |

* cited by examiner

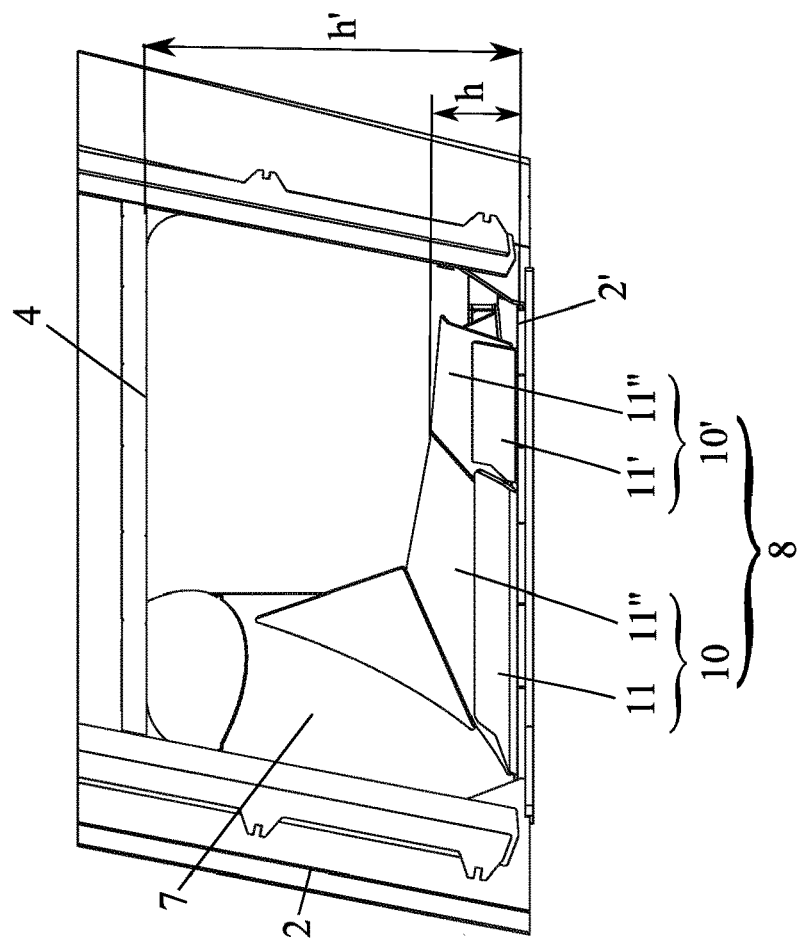
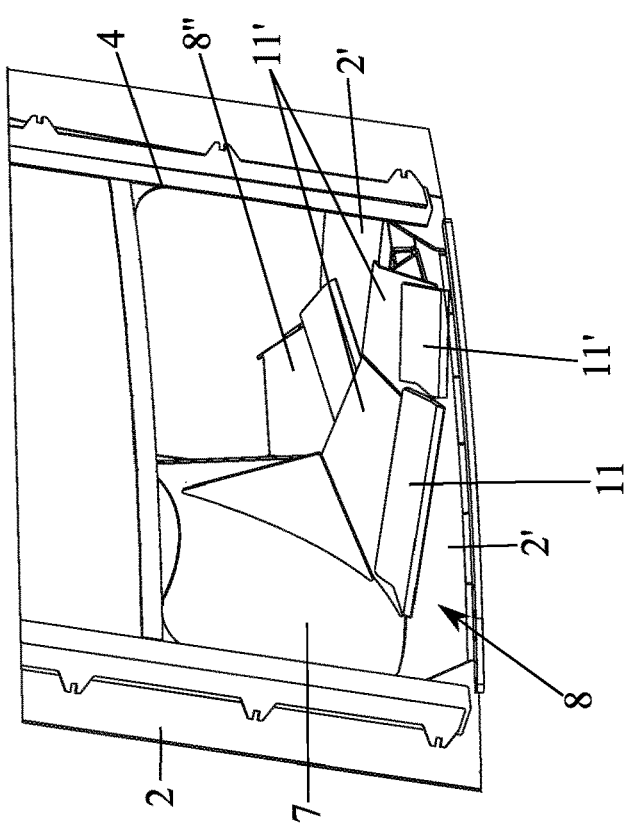

AGRICULTURAL MACHINE FOR TRANSPORTATION AND DISTRIBUTION OF BULK PRODUCTS

The present invention relates to the field of agricultural machinery, more particularly to mobile machinery for distributing bulk products for animal feed, and it has as its object an agricultural machine for transportation and distribution of such products.

More specifically, the invention relates to an agricultural machine that is self-propelled or in the form of a trailer to be hitched for transportation and distribution of bulk products, especially intended as animal feed. Such a machine comprises a tank or analogous receptacle, which is mounted on a rolling chassis, which is provided with at least one sealable opening and is situated substantially close to or at the level of the bottom of the tank and which is equipped with at least one mobile means performing scraping of the said bottom and favoring ejection of the product through the said at least one opening.

Numerous embodiments of agricultural machines of this type are already known in the prior art.

In a first type of known machine, in the form of distributing trailers, a conveyor belt comprising mobile transverse slats, driven by lateral chains, scrapes the bottom of the tank and transports the product contained therein toward a discharge opening situated at the front. However, in trailers of this type, the entire product present in the tank is transported (necessitating adequate dimensioning of the chains, slats and drive means), and part of the product is carried under the slats by the belt. In addition, aeration or disaggregation of the product compacted during transportation is necessary (requiring a separator at the level of the outlet opening), and the product must be distributed over the entire length of the tank during loading.

Machines of the distributing mixer type are also known, such as, for example, those of the PROFILE or EUROMIX product lines of the Applicant, which are provided with at least one vertical mixing auger. Such a helicoidal rotary auger, in one piece or segmented, tapering upward, realizes a plurality of functions, to wit: mixing and aeration of the product, distribution of the product in the tank, scraping of the bottom of the tank and ejection of the product during distribution (open discharge opening(s)). With such a helicoidal rotary auger, the distribution is not very homogeneous, since only the product in front of the helicoidal rotary auger is ejected through the opening and the rest of the product is entrained upward by the auger. In general, the helicoidal rotary auger or augers has or have a height greater than the height of the discharge opening. This great height makes it possible to ensure homogeneous mixing in the tank, since the product positioned at the bottom of the tank is entrained upward by virtue of the helicoidal auger.

Due to the drive of multifunctional augers, such a distributing mixer needs high power, even when only the distribution function is required (the other functions are systematically realized at the same time).

In addition, during rotation of such an auger for mixing, scraping and ejection, the product is displaced upward, thus reducing the effectiveness in terms of discharging.

The primary objective of the present invention is to overcome the inconveniences and limitations mentioned in the foregoing, and especially to provide an agricultural machine of the type envisioned in the introduction, in which the discharge and distribution of the product are more efficient, making it possible to realize homogeneous distribution of large quantities of product, and to do so with reduced energy consumption and power requirement.

This objective is achieved, for an agricultural machine of the aforesaid type, by providing that the mobile means or each mobile means for scraping and ejection is a means mounted to rotate around a vertical shaft or axis, perpendicular relative to the bottom plane and comprising at least two separate radial arms, distributed around the axis and, as the case may be, sweeping over substantially the entire surface of the bottom in cooperation with the arms of at least one other means, wherein the thickness or the height of each arm relative to the bottom is smaller than the height of the lateral opening or of each lateral opening extending from the bottom and in front of which opening or openings the arm under consideration passes during rotation of the mobile means in question.

The invention will be better understood by virtue of the description hereinafter, which relates to preferred embodiments, provided by way of non-limitative examples and explained with reference to the attached schematic drawings, wherein.

Figure 1A:
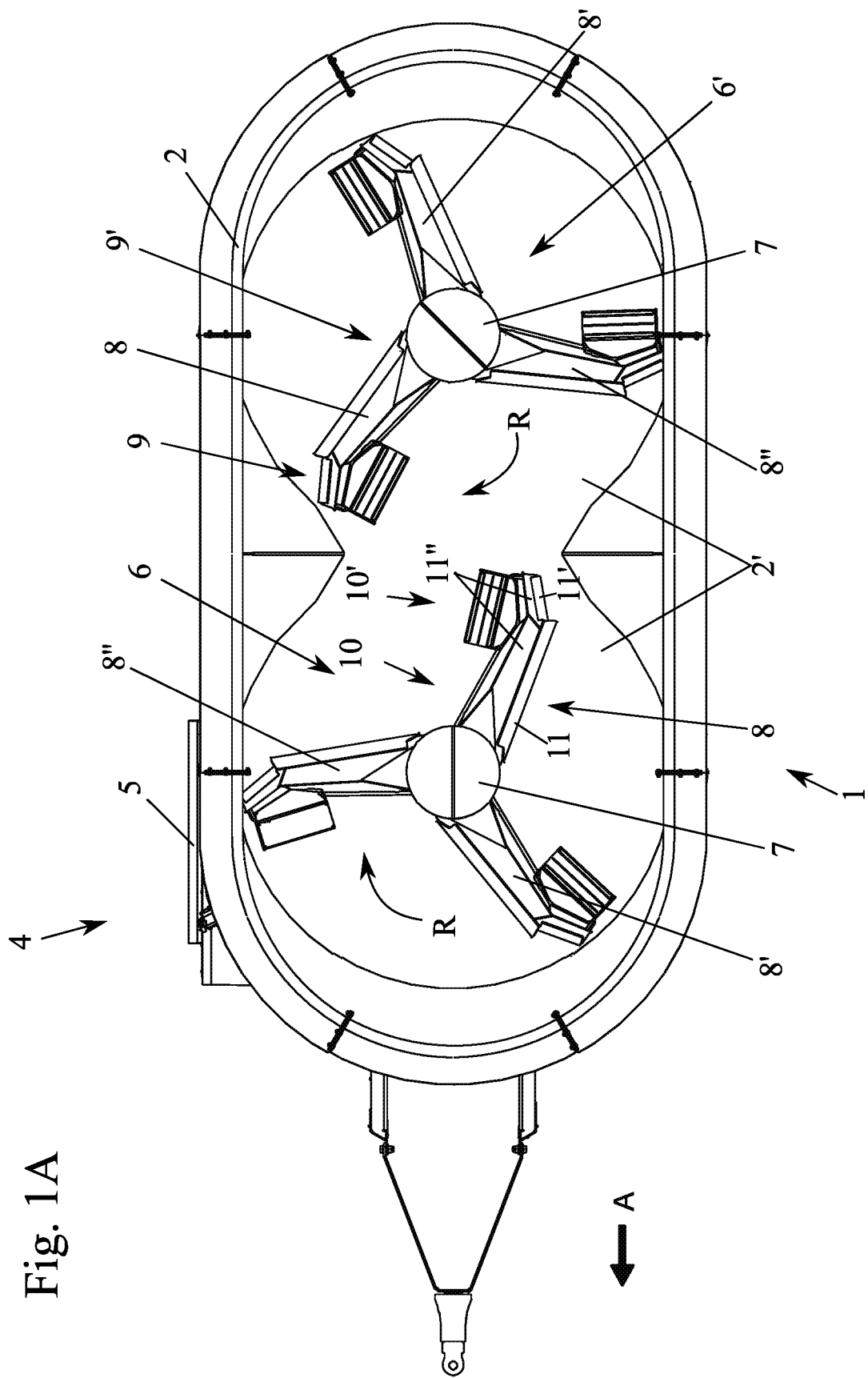
FIGS. 1A and 1B are respectively views from above (FIG. 1A) and in section along its longitudinal center axis (FIG. 1B), of a distributing trailer according to a first embodiment of the invention.
Figure 1B:
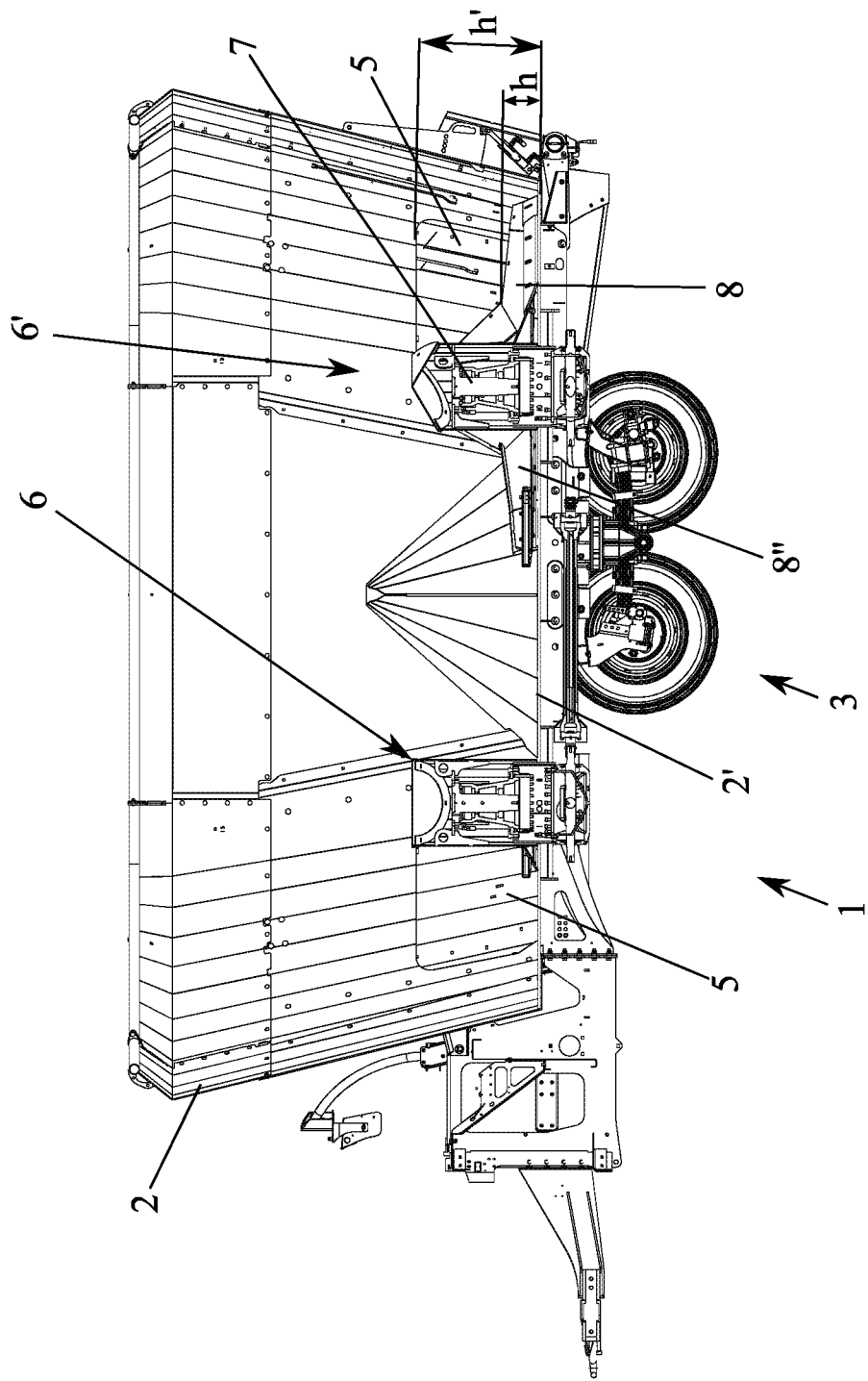
Figure 5:
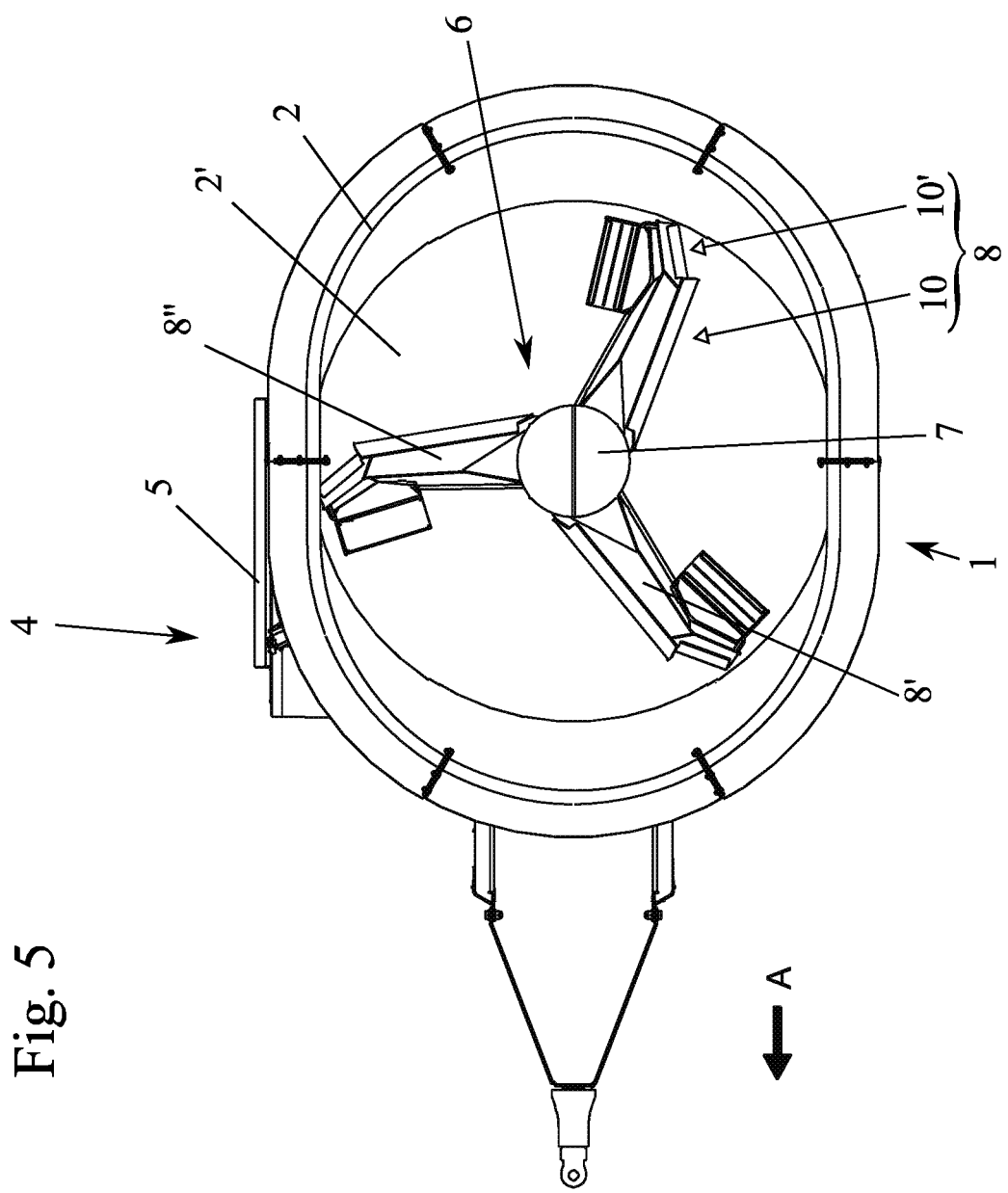

FIGS. 3 and 4 are detail views on a different scale, respectively in perspective (FIG. 3) and in lateral elevation (FIG. 4), of a arm of a rotary mobile means for scraping and ejection, constituting part of an agricultural machine such as represented in FIG. 1, viewed through a lateral opening for discharge and distribution provided in the tank, and FIG. 5 is a view from above of a distributing trailer with circular bottom, equipped with a single mobile means for scraping and ejection.

FIGS. 2 to 5 illustrate an agricultural machine 1, in the form of a trailer to be hitched, for transportation and distribution of bulk products, especially intended as animal feed.

This machine 1 comprises a tank or analogous receptacle 2, which is mounted on a rolling chassis 3, which is provided with at least one sealable opening 4 (with a sliding or pivoting door 5, for example) and situated substantially close to or at the level of bottom 2' of tank 2 and which is equipped with at least one mobile means 6, 6' performing scraping of the said bottom 2' and favoring ejection of the product through the said at least one opening 4. The opening or openings 4 may be positioned laterally, at the front or rear of tank 2, relative to the normal direction of displacement (forward direction A) of machine 1.

As the figures show, this opening or these openings 4 is or are made in the side wall of tank 2 and extend down to the level of bottom 2'.

In conformity with the invention, the mobile means or each mobile means 6, 6' for scraping and ejection is a means mounted to rotate around a vertical shaft or axis 7, perpendicular relative to the plane of bottom 2' and comprising at least two separate radial arms 8, 8', 8", 8"', distributed around axis 7 and, as the case may be, sweeping over substantially the entire surface of bottom 2' in cooperation with arms 8, 8', 8", 8"' of at least one other means 6, 6', wherein the thickness or the height h of each arm 8, 8', 8", 8"' relative to bottom 2' is smaller than the height h' of lateral opening 4 or of each lateral opening 4 extending from bottom 2' and in front of which opening or openings the arm 8, 8', 8", 8'" under consideration passes during rotation of the mobile means 6, 6' in question.

It is necessary to consider the height h of one of the arms of mobile means 6, 6' that is associated at least partly with distribution opening 4 of tank 2. Advantageously, the different arms 8, 8', 8", 8'" mounted on one and the same mobile means 6, 6' are identical. According to one alternative, not illustrated, the arms may be of different shape and geometry. Thus one of the arms may have a shorter length than another arm, and/or a different height. In the comparison of height between door 4 and arms 8, 8', 8", 8'", it is possible to choose the arm that has a reduced height compared with the other arms (in the case of different arm heights).

By virtue of the invention, it is therefore possible to discharge tank 2 in a manner that is easily controllable, efficient and up to complete emptying, wherein all of this needs only limited power.

In fact, by providing means for scraping and ejection with discontinuous structure (arms 8, 8', 8", 8'" that are distinct, separate and mutually spaced apart), wherein each has a limited height, the quantity of material impacted and displaced during the rotary movement of each means 6, 6' is limited, and by this fact necessitates a rotary torque of only limited value. In addition, the lifting of bulk products during the displacement of means 6, 6' is merely fleeting and temporary, since it is restricted to solely the narrow vertical volume situated level with the arm under consideration and confined only to a given instant (when the said arm is situated under the said volume).

Consequently, the zone of interaction between means 6, 6' and the bulk product or products is limited to the height of the evacuation opening and more precisely to a discoidal volume of small thickness situated on bottom 2' of tank 2. In addition, no overall action of lifting of products nor otherwise of volume mixing is attempted by scraping and ejection means 6, 6', in contrast to the helicoidal rotary augers used in the prior art machines, coiled around axes 7 and extending upward in the tank, over a height clearly greater than that of the evacuation opening in question. By eliminating, in accordance with the invention, the dependence on such a mixing auger with continuous structure and continuously entraining the bulk products upward, the power necessary to drive the axis or each axis 7 is reduced and a higher speed of rotation of means 6, 6' is possible, thus permitting faster discharge and distribution of the said products.

Figure 1C:
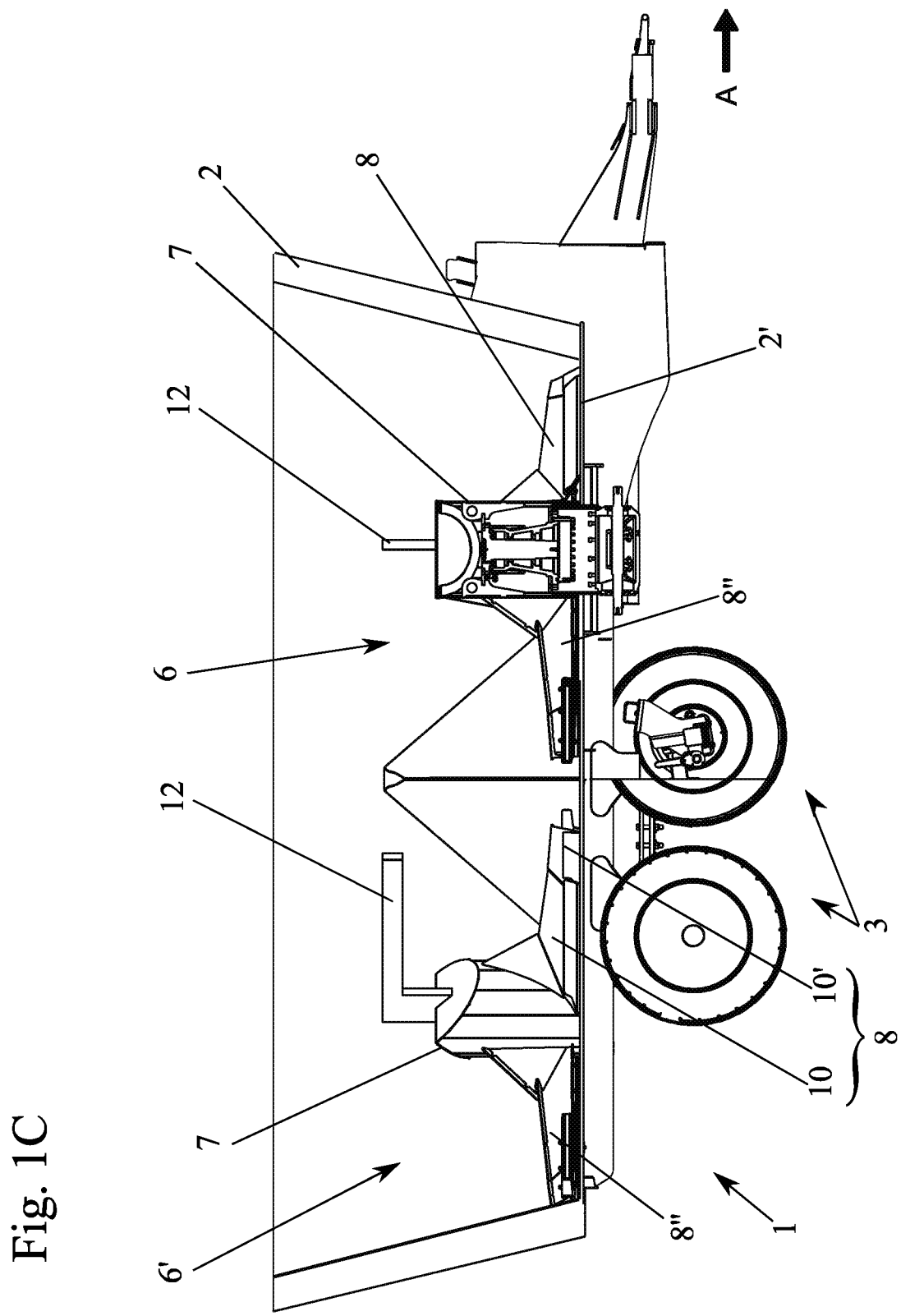
FIG. 1C is a view partly in section similar to FIG. 1B or an alternative embodiment of the trailer of FIG. 1A.
Figure 2:
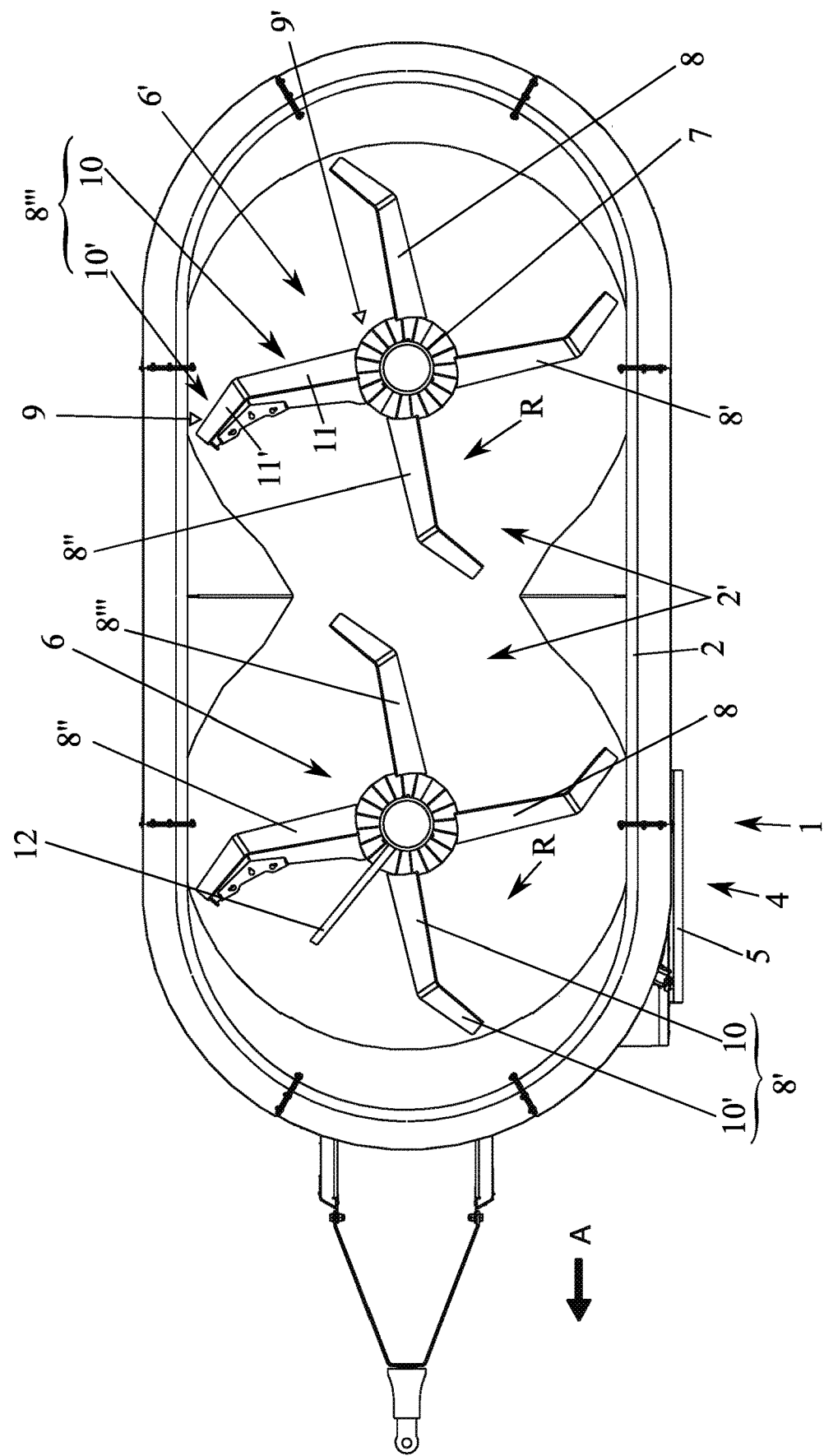
FIG. 2 is a view from above of a tank of an agricultural machine according to a second embodiment of the invention.

The exemplary embodiment illustrated in FIGS. 1 and 2 represents an agricultural machine with twin mobile scraping and ejection means 6 and 6', with a single lateral opening 4 associated with the front mobile means 6, taking into account the forward direction A. The direction of rotation of first mobile means 6 is established so as to eject via opening 4 situated at the front on the right side (FIG. 1A) or on the left side (FIG. 2) of tank 2 (according to direction A). The rotation of the two mobile means 6 and 6' takes place in the same direction. And second means 6' then feeds the first means with product arriving from the rear of tank 2. According to one alternative, it is conceivable that the two mobile means 6 and 6' turn in inverse directions. Such a configuration makes it possible to optimize the direction of rotation of the mobile means for better distribution associated with the door.

In one advantageous solution, one 6' of the mobile means 6, 6' is driven in rotation after the other 6, with the objective of reducing the startup power and doing so by virtue of a disengaging device. The second mobile means may be driven, for example after a part of the product to be distributed has already been distributed by first mobile means 6.

In another solution, not illustrated, the drive of each of means 6, 6' is realized by way of an electric motor or of a hydraulic means, preferably of its own.

Scraping of bottom 2' of tank 2 is effected by several mobile means that can be disposed either one behind the other as represented in FIGS. 1A, 1C and 2, or side-by side. In this case, the diameter of mobile means 6, 6' is reduced and the geometry of bottom 2' of tank 2 is adapted accordingly. An additional mobile means may also be disposed at the rear of two mobile means 6 and 6' arranged side by side.

Due to the absence of junction and therefore of continuity between successive radial arms 8, 8', 8", 8'" in the arrangement around shaft 7, the product falls or drops back onto bottom 2' of tank 2 after the passage of each arm and therefore is not displaced upward in tank 2.

The person skilled in the art understands that bottom 2' of tank 2 has a circular conformation or is formed in adjacent and partly overlapping circular zones, wherein the axis of shaft 7 associated with the bottom zone under consideration passes through the center of the peripheral circle thereof and radial arms 8, 8', 8", 8'" of associated means 6, 6' are dimensioned so as to sweep over the entirety of the said zone during their displacement.

Following different practical tests, the inventors observed that the best compromise between complexity of construction and effectiveness of discharge consisted in providing that each mobile means 6, 6' has at least three, preferably four elongated arms 8, 8', 8", 8'", mutually separate and independent, and distributed in angularly equidistant manner around axis or shaft 7 of the same means 6, 6'.

In accordance with one constructive characteristic of the invention, apparent in particular from FIG. 3A and FIGS. 1A and 2, each arm 8, 8', 8", 8'" is configured and dimensioned in such a way that it passes, with its distal end 9, in the immediate proximity of at least one lateral opening 4 of tank 2 during the rotation of mobile scraping and ejection means 6, 6' to which the said arm 8, 8', 8", 8'" belongs.

In order to favor the centrifugal movement of radial ejection during the rotary displacement of means 6, 6' under consideration, the invention provides favorably that each arm 8, 8', 8", 8'" has two contiguous longitudinal segments 10 and 10', to with an internal primary segment 10 of greater length, connected to shaft 7 and extending radially therefrom, and an external secondary segment 10' of shorter length, extending in the prolongation of primary segment 10 and inclined toward the rear, when viewed in the direction of rotation R of mobile means 6, 6' during normal operation, relative to the said primary segment 10 (FIGS. 1A, 2 and 3A).

Advantageously, the lateral face of each arm 8, 8', 8", 8'" that is situated on the leading side during the rotation of mobile means 6, 6' in question is provided with at least one scraping element 11, 11', preferably mounted in easily interchangeable manner, in the capacity of a wearing part.

In addition, each of the two longitudinal segments 10 and 10' of each arm 8, 8', 8", 8'" may be provided with its own scraping element 11 or 11'.

As is apparent from FIGS. 3 and 4 in particular, these scraping elements 11, 11' may be mounted in front of and below deflecting plates 11", with which they form bevels. The assembly of these inclined parts 11, 11', 11" for detaching, lifting and pushing the product contained in tank 2 is fixed, for example, on a rigid radial bar, which may or may not be segmented, integral with shaft 7 of mobile means 6, 6' under consideration.

In view of limiting the cost price and of optimizing the scraping and ejection, it may be provided that each arm 8, 8', 8'', 8''' has a section that decreases continuously or in steps from its end 9' proximal to shaft 7, where it is connected thereto, to its free distal end 9.

In particular, the height h of an arm may decrease according to the centrifuging direction, although its value is nevertheless always smaller than the height h' of associated opening 4, at least in its end region. Advantageously, all the arms have, over the majority of their extent, a height h smaller than the height h' of opening 4 (see FIGS. 3 and 4).

Preferably, to optimize the material cost while guaranteeing sufficient rigidity, each arm 8, 8', 8'', 8''' has a cross section of triangular shape.

As already indicated, tank 2 may have, at the level of bottom 2', either a circular shape (FIG. 5) or an oblong or elliptical shape (FIGS. 1 and 2).

Within the scope of the first constructive variant (FIG. 5), the presence of a single rotary mobile means 6 is adapted, whereas, within the scope of the second constructive variant (FIGS. 1 and 2), at least two means 6 and 6' aligned according to the longitudinal axis of tank 2 and having swept surfaces that may or may not overlap partly are preferably provided.

In addition, a single opening 4 may be associated with each mobile means 6, 6'. Alternatively, at least two openings 4, situated on different sides of tank 2, may be associated with each means 6, 6'.

When it is advantageous before distribution for the product to be distributed to undergo an operation of aeration, disaggregation or deagglomeration and/or homogenization, the invention may additionally provide that at least one agitator element 12 is associated with at least one mobile means 6, 6' and that, advantageously, rotary shaft 7, constituting part of the one or of each mobile means 6, 6' and carrying radial arms 8, 8', 8'', 8''' of means 6, 6' under consideration is equipped with at least one supplementary agitator element 12. Such an agitator element 12 is illustrated in FIG. 2. Agitator element 12 preferably extends above the radial arm or arms 8, 8', 8'', 8'''. Agitator element 12 therefore has no contact with bottom 2' of tank 2, and its function is to facilitate disaggregation, circulation and distribution of the product following transportation during which the product has settled in the tank. Agitator element 12 advantageously has, just as means 6, 6', a structure such that it interacts only over limited surface with the product present in tank 2 and such that it is displaced therein with limited spatial perturbation of the product that is present. Preferably, this element 12 has a shape similar to a cutter with radial straight blade, to an angled cutter or any other shape capable of decompacting or aerating the product to be distributed.

Agitator element 12 may be driven selectively in rotation, for example with imposed rotation that can be disengaged relative to shaft 7 or by rotational decoupling of an upper portion of the said shaft 7 carrying the agitator element or elements.

Whereas FIG. 2 illustrates an alternative embodiment in which a single mobile means 6 is equipped with an element 12, FIG. 1C illustrates another variant in which each means 6 and 6' is provided with such an element 12.

In any case, the means 6, 6' in all alternative embodiments of the invention are not provided with specific means for mixing of products.

Of course, the invention is not limited to the embodiments described and represented in the attached drawings. Modifications are still possible especially from the viewpoint of the constitution of the various elements or by substitution of equivalent techniques, without departing from the scope of protection of the invention.

The invention claimed is:

1. An agricultural machine that is self-propelled or in a form of a trailer to be hitched for transportation and distribution of a bulk product, the agricultural machine comprising:
   a tank mounted on a rolling chassis, the tank being provided with a sealable opening situated substantially close to or at a level of a bottom of the tank; and
   a mobile means performing scraping of said bottom of the tank and favoring ejection of the bulk product through said opening,
   wherein the mobile means is a means mounted to rotate around a vertical shaft or axis, perpendicular relative to a plane of the bottom of the tank and comprising at least two separate radial arms, distributed around the axis,
   wherein the mobile means does not include a helicoidal rotary auger,
   wherein each arm includes a first end attached to the axis and a second end radially offset from the first end, and a portion extending radially between the first end and the second end, each portion of each arm being separate, discontinuous, distinct, and mutually spaced apart from each other, and
   wherein a thickness or a height of each arm relative to the bottom of the tank is smaller than a height of the opening extending from the bottom of the tank and in front of the opening during rotation of the mobile means.

2. The agricultural machine according to claim 1, wherein the mobile means is provided with at least three radial arms distributed in angularly equidistant manner around the axis of said mobile means.

3. The agricultural machine according to claim 1, wherein each arm is configured and dimensioned in such a way that a distal end of said arm passes in an immediate proximity of the opening of the tank during the rotation of the mobile means.

4. The agricultural machine according to claim 1, wherein each arm is provided with two contiguous longitudinal segments including an internal primary segment of greater length, connected to the axis and extending radially therefrom, and an external secondary segment of shorter length, extending in prolongation of the primary segment and inclined rearward in a direction of rotation of the mobile means relative to said primary segment.

5. The agricultural machine according to claim 1, wherein a lateral face of each arm that is situated on a leading side during the rotation of the mobile means is provided with a scraping element.

6. The agricultural machine according to claim 4, wherein each of the two longitudinal segments of each arm is provided with a scraping element.

7. The agricultural machine according to claim 1, wherein the portion of each arm decreases continuously or in steps from the first end to the second end.

8. The agricultural machine according to claim 1, wherein each arm has a cross section of triangular shape.

9. The agricultural machine according to claim 1, wherein at least one agitator element is associated with the mobile means.

* * * * *